US012058727B2

(12) United States Patent
Yang et al.

(10) Patent No.: US 12,058,727 B2
(45) Date of Patent: Aug. 6, 2024

(54) SYSTEMS AND METHODS FOR OVERRIDING GRANTS FOR CSI-FEEDBACK

(71) Applicant: APPLE INC., Cupertino, CA (US)

(72) Inventors: Weidong Yang, Cupertino, CA (US); Jie Cui, Cupertino, CA (US); Seyed Ali Akbar Fakoorian, Cupertino, CA (US); Amir Aminzadeh Gohari, Cupertino, CA (US); Hong He, Cupertino, CA (US); Haijing Hu, Cupertino, CA (US); Chao Jin, Cupertino, CA (US); Ruoheng Liu, Cupertino, CA (US); Huaning Niu, Cupertino, CA (US); Oghenekome Oteri, San Diego, CA (US); Ralf Rossbach, Bavaria-Bayern (DE); Haitong Sun, Cupertino, CA (US); Yang Tang, Cupertino, CA (US); Sarma V. Vangala, Cupertino, CA (US); Fangli Xu, Beijing (CN); Chunhai Yao, Beijing (CN); Chunxuan Ye, San Diego, CA (US); Sigen Ye, Cupertino, CA (US); Wei Zeng, Cupertino, CA (US); Dawei Zhang, Cupertino, CA (US); Wenshu Zhang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 413 days.

(21) Appl. No.: 17/593,303

(22) PCT Filed: Oct. 22, 2020

(86) PCT No.: PCT/CN2020/122925
§ 371 (c)(1),
(2) Date: Sep. 15, 2021

(87) PCT Pub. No.: WO2022/082638
PCT Pub. Date: Apr. 28, 2022

(65) Prior Publication Data
US 2022/0312436 A1 Sep. 29, 2022

(51) Int. Cl.
*H04W 72/566* (2023.01)
*H04W 72/1268* (2023.01)
*H04W 72/23* (2023.01)

(52) U.S. Cl.
CPC ..... *H04W 72/569* (2023.01); *H04W 72/1268* (2013.01); *H04W 72/23* (2023.01)

(58) Field of Classification Search
CPC .......................... H04W 72/569; H04W 72/23; H04W 72/1268
See application file for complete search history.

(56) References Cited

U.S. PATENT DOCUMENTS 11,153,060 B2 * 10/2021 Babaei ................. H04B 7/0632
2018/0270699 A1 * 9/2018 Babaei ............. H04W 28/0278
(Continued)

FOREIGN PATENT DOCUMENTS

| CN | 104936300 A | 9/2015 |
| CN | 107295666 A | 10/2017 |

OTHER PUBLICATIONS

PCT/CN2020/122925, et al., International Search Report and Written Opinion, Jul. 15, 2021, 9 pages.
(Continued)

*Primary Examiner* — Jael M Ulysse
(74) *Attorney, Agent, or Firm* — Dorsey & Whitney LLP

(57) ABSTRACT

Systems and methods are provided for controlling behavior for overriding grants for channel state information (CSI) feedback. A user equipment (UE) may control override of a first grant of a first radio resource by a second grant of a
(Continued)

second radio resource. The UE determines that the second radio resource at least partially overlaps with the first radio resource. The UE also determines a physical layer priority of the first grant of the first radio resource and the second grant of the second radio resource. The physical layer priority is based on at least one of the first grant of the first radio resource and the second grant of the second radio resource being configured for transmitting CSI feedback over a physical uplink shared channel (PUSCH) to a base station. The UE then generates a transmission according to the physical layer priority.

18 Claims, 9 Drawing Sheets

(56) References Cited

U.S. PATENT DOCUMENTS

| | | | | |
|---|---|---|---|---|
| 2018/0368157 | A1* | 12/2018 | Jeon | H04W 72/044 |
| 2019/0207731 | A1* | 7/2019 | Park | H04B 7/0456 |
| 2019/0357178 | A1* | 11/2019 | Bae | H04L 5/0044 |
| 2020/0146045 | A1* | 5/2020 | Loehr | H04L 1/1812 |
| 2020/0305191 | A1* | 9/2020 | Moon | H04W 72/23 |
| 2020/0313831 | A1* | 10/2020 | Kim | H04W 72/23 |
| 2020/0314883 | A1* | 10/2020 | Chin | H04W 80/02 |
| 2021/0007149 | A1* | 1/2021 | Li | H04W 74/0833 |
| 2021/0092763 | A1* | 3/2021 | Li | H04W 72/21 |
| 2021/0105812 | A1* | 4/2021 | Rastegardoost | H04L 1/08 |
| 2021/0168848 | A1* | 6/2021 | Chatterjee | H04W 72/569 |
| 2021/0258974 | A1* | 8/2021 | Hosseini | H04L 5/0064 |
| 2021/0258981 | A1* | 8/2021 | Hosseini | H04W 72/566 |
| 2021/0259010 | A1* | 8/2021 | Yang | H04W 72/23 |
| 2021/0307027 | A1* | 9/2021 | Kung | H04W 72/569 |
| 2022/0104241 | A1* | 3/2022 | Zou | H04W 72/1268 |
| 2022/0104259 | A1* | 3/2022 | Li | H04W 74/0816 |
| 2022/0159667 | A1* | 5/2022 | Zhang | H04W 72/0453 |

OTHER PUBLICATIONS

ETRI, "Enhanced inter UE TX prioritization/multiplexing", R1-1907041, 3GPP TSG RAN WG1 #97, Reno, Nevada, Agenda Item 7.2.6.5, May 13-17, 2019, 4 pages.

Nokia, Nokia Shanghai Bell, "Revised WID: Enhanced Industrial Internet of Things (IOT) and ultra-reliable and low latency communication (URLLC) support for Nr", RP-201310 (Revision of RP-193233) 3GPP TSG RAN Meeting #88e, Electronic Meeting, Agenda Item 9.10.5, Jun. 29-Jul. 3, 2020, 6 pages.

Qualcomm Incorporated, "Summary for REl-15 CRs on DL/UL data scheduling and HARQ procedure", R1-1903780, 3GPP TSG-RAN WG1 Meeting #96, Athens, Greece, Agenda Item 7.1.3, Feb. 25-Mar. 1, 2019, 6 pages.

Vivo, "Remaining issues on UL data transmission for URLLC", R1-1806070, 3GPP TSG RAN WG1 Meeting #92bis, Busan, Korea, Agenda Item 7.1.3.3.4, May 21-25, 2018, 5 pages.

* cited by examiner

| | | Low Priority | | | | | | | |
|---|---|---|---|---|---|---|---|---|---|
| | | DG PUSCH with UL-SCH | CG PUSCH | A-CSI only over PUSCH | SP-CSI on PUSCH | PUCCH with SR | PUCCH with BFR | PUCCH with HARQ-ACK for DG PDSCH | PUCCH with HARQ-ACK for SPS PDSCH | SP/SP-CSI on PUCCH |
| High Priority | DG PUSCH with UL-SCH | | | | 302 | | | | | |
| | CG PUSCH | | | 310 | 304 | | | | | |
| | A-CSI only over PUSCH | | 312 | | 306 | | | | | |
| | SP-CSI on PUSCH | 314 | 316 | 318 | 308 | | | | | |
| | PUCCH with SR | | | | | | | | | |
| | PUCCH with BFR | | | | | | | | | |
| | PUCCH with HARQ-ACK for DG PDSCH | | | | | | | | | |
| | PUCCH with HARQ-ACK for SPS PDSCH | | | | | | | | | |

FIG. 3

SYSTEMS AND METHODS FOR OVERRIDING GRANTS FOR CSI-FEEDBACK

TECHNICAL FIELD

This application relates generally to wireless communication systems, including physical layer priority for semi-persistent (SP) channel state information (CSI) over a physical uplink shared channel (PUSCH).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a table of example combinations of high priority and low priority channel and data type combinations in accordance with one embodiment.

DETAILED DESCRIPTION

In wireless communication systems, there is a need to clarify overriding behaviors between dynamic grant (DG) and configured grant (CG) of radio resources (i.e., time and frequency resources) that at least partially overlap with one another. Some combinations of channel and/or data types still do not have clearly defined overriding behaviors. It has been proposed to support physical layer priority for semi-persistent (SP) channel state information (CSI) over a physical uplink control channel (PUCCH). Physical layer priority for SP CSI over physical uplink shared channel (PUSCH) may also be introduced for certain wireless communication systems.

However, for SP-CSI carried over PUSCH, as there is no media access control (MAC) protocol data unit (PDU) associated with the PUSCH, applicability of DG/CG behavior derived for certain cases needs to be determined. Further, for aperiodic (AP) CSI only transmission over PUSCH, as there is no MAC PDU associated with the PUSCH, applicability of DG/CG behavior derived for certain other cases also needs to be decided.

In certain wireless communication systems (e.g., see 3GPP Technical Specification (TS) 38.214, Rel.-15), a UE is not expected to be scheduled by a PDCCH ending in symbol i to transmit a PUSCH on a given serving cell overlapping in time with a transmission occasion, where the UE is allowed to transmit a PUSCH with configured grant (e.g., according to 3GPP TS 38.321), starting in a symbol j on the same serving cell if the end of symbol i is not at least N2 symbols before the beginning of symbol j. The value N2 in symbols is determined according to the UE processing capability (e.g., as defined in clause 6.4 of 3GPP TS 38.214), and N2 and the symbol duration are based on the minimum of the subcarrier spacing corresponding to the PUSCH with configured grant and the subcarrier spacing of the PDCCH scheduling the PUSCH.

Figure 1:
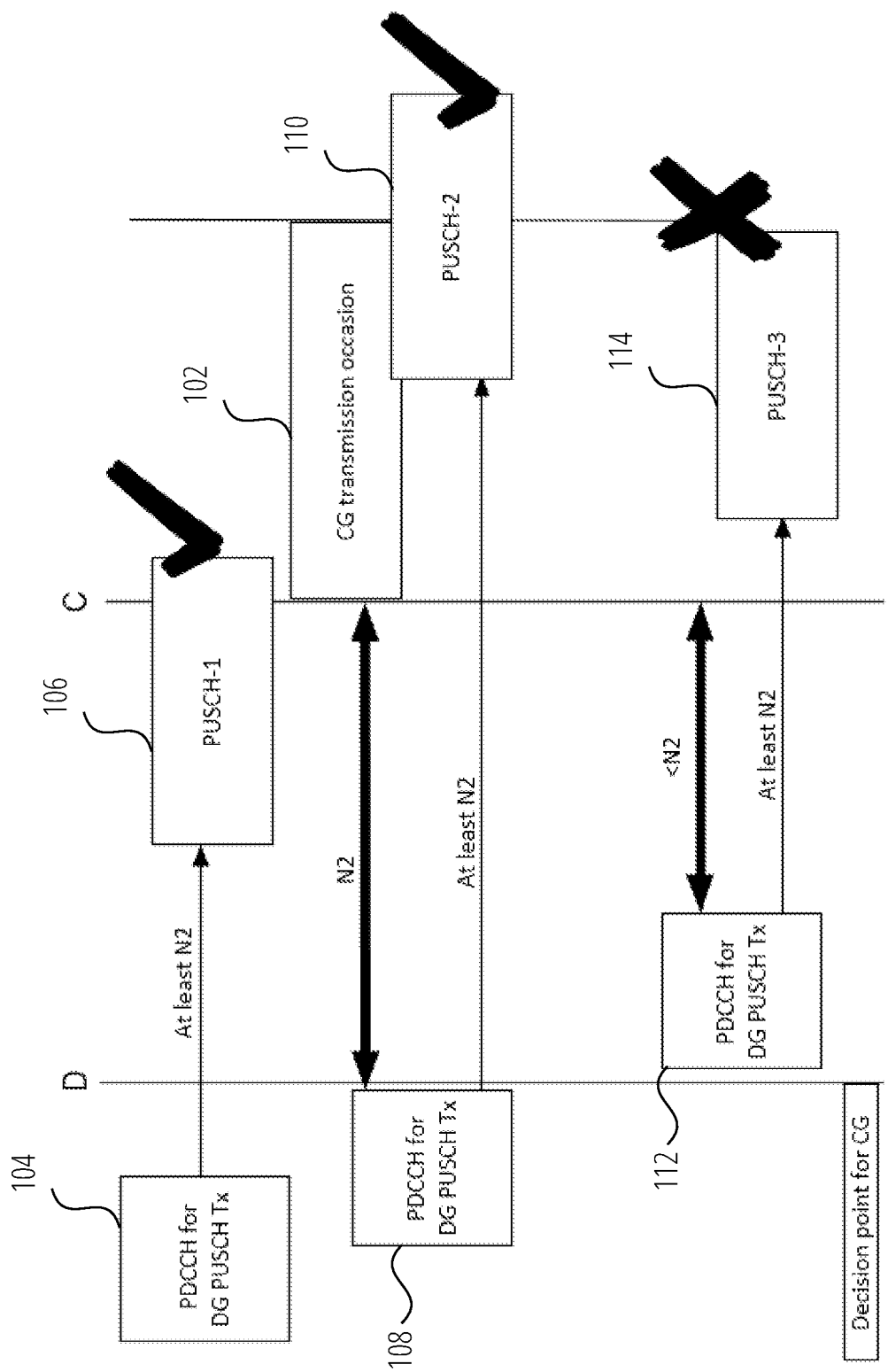
FIG. 1 illustrates example overriding restrictions in a UE according to certain wireless communication systems.

For example, FIG. 1 illustrates three cases for CG versus DG overriding restrictions in a UE according to certain wireless communication systems. In FIG. 1, a time "C" corresponds to a start of a CG transmission occasion 102 and a time "D" corresponds to a decision point for CG (e.g., the point at which the UE decides whether or not to override the CG transmission occasion 102 with a DG PUSCH. Time C and Time D are separated by the N2 symbols discussed above.

In a first illustrated case (DG ahead of CG transmission), a first PDCCH 104 for DG PUSCH transmission (Tx) is received by the UE to schedule a first PUSCH 106 (PUSCH-1) at least N2 symbols after receiving the first PDCCH 104, which in this example is before the start of the CG transmission occasion 102 at the time C. Because the first PDCCH 104 is received before the decision point at time D, the UE is allowed to transmit the first PUSCH 106 and the CG transmission occasion 102 is dropped (or delayed or punctured).

In a second illustrated case (DG starting no earlier than CG transmission), a second PDCCH 108 for DG PUSCH Tx is received by the UE to schedule a second PUSCH 110 (PUSCH-2) at least N2 symbols after receiving the second PDCCH 108, which in this example is after the start of the CG transmission occasion 102. Because the second PDCCH 108 is received before the decision point at time D, the UE is allowed to transmit the second PUSCH 110 and the CG transmission occasion 102 is dropped (or delayed or punctured).

In a third illustrated case, a third PDCCH 112 for DG PUSCH Tx is received by the UE to schedule a third PUSCH 114 (PUSCH-3) at least N2 symbols after receiving the third PDCCH 112, which in this example is less than N2 symbols before the start of the CG transmission occasion 102 at the time C. Thus, because the third PDCCH 112 is received by the UE after the decision point at the time D, the third PUSCH 114 is not allowed to be transmitted and instead the UE transmits the CG transmission occasion 102.

In addition to the examples described above with respect to FIG. 1, in certain wireless communication systems (e.g., see 3GPP Technical Specification (TS) 38.214, Rel.-15) a UE is not expected to be scheduled by a PDCCH ending in symbol i to transmit a PUSCH on a given serving cell for a given hybrid automatic repeat request (HARQ) process, if there is a transmission occasion where the UE is allowed to transmit a PUSCH with configured grant (e.g., according to 3GPP TS 38.321) with the same HARQ process on the same serving cell starting in a symbol j after symbol i, and if the gap between the end of PDCCH and the beginning of symbol j is less than N2 symbols. The value N2 in symbols is determined according to the UE processing capability (e.g., as defined in clause 6.4 of 3GPP TS 38.214), and N2 and the symbol duration are based on the minimum of the subcarrier spacing corresponding to the PUSCH with configured grant and the subcarrier spacing of the PDCCH scheduling the PUSCH.

For configured uplink grants, the HARQ Process identifier (ID) (see, e.g., 3GPP TS 38.321, Rel.-15) associated with the first symbol of a UL transmission is derived from the equation HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively (e.g., as specified in 3GPP TS 38.211). The CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes. If the MAC entity receives both a grant in a Random Access Response and an overlapping grant for its cell specific radio network temporary identifier (C-RNTI) or configured scheduling radio network temporary identifier (CS-RNTI), requiring concurrent transmissions on the SpCell, the MAC entity may choose to continue with either the grant for its RA-RNTI or the grant for its C-RNTI or CS-RNTI.

Figure 2:
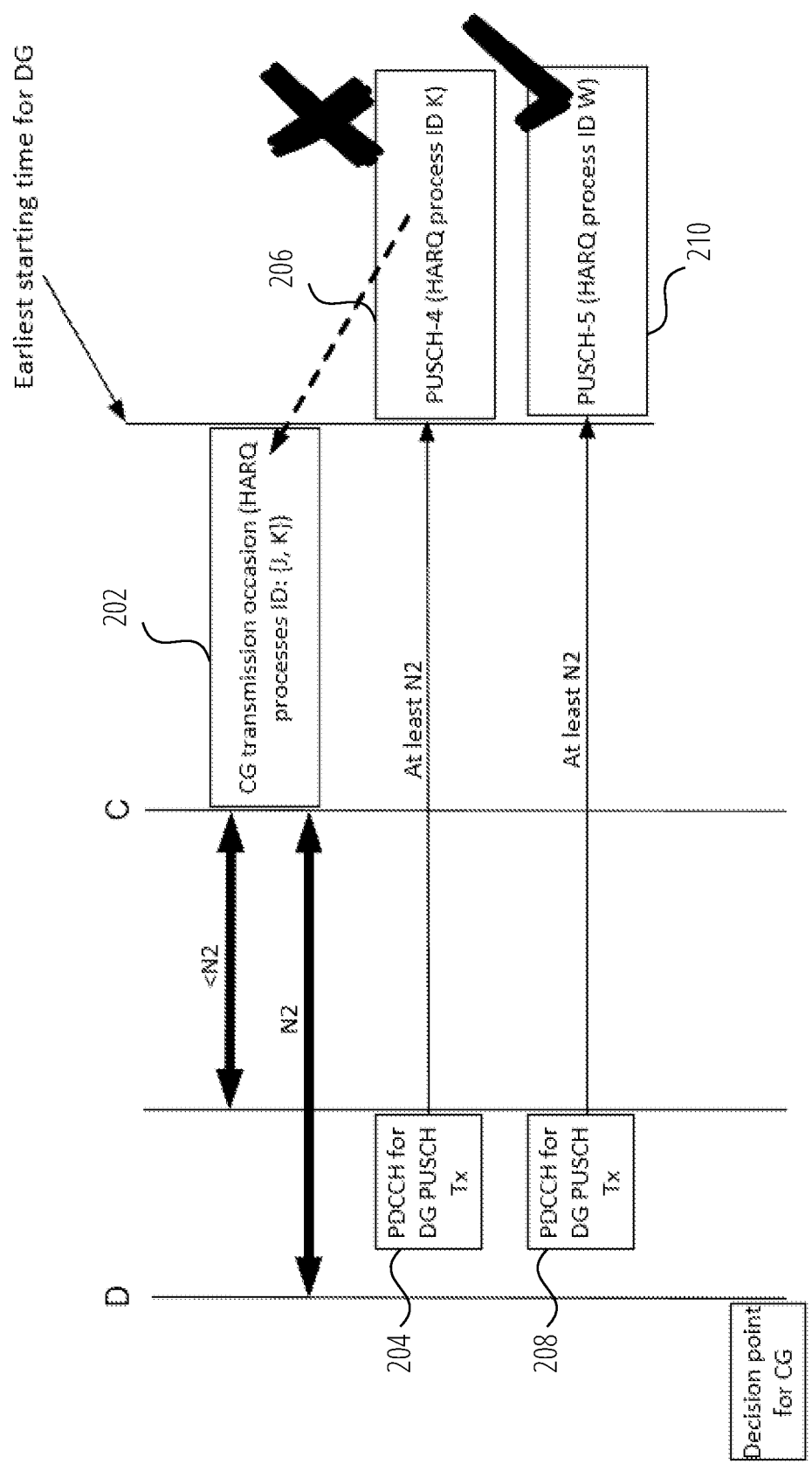
FIG. 2 illustrates additional example overriding restrictions involving HARQ process IDs according to certain wireless communication systems.

For example, similar to the cases discussed in FIG. 1, FIG. 2 illustrates two additional cases for CG versus DG overriding restrictions involving HARQ process IDs according to certain wireless communication systems. In FIG. 2, time C corresponds to a start of a CG transmission occasion 202 and time D corresponds to a decision point for CG (e.g., the point at which the UE decides whether or not to override the CG transmission occasion 202 with a DG PUSCH. Time C and Time D are separated by the N2 symbols discussed above. The CG transmission occasion 202 corresponds to HARQ process IDs J and K. For example, in a given slot, a first CG configuration (e.g., a first Tx or first "0" in [0303]) may be associated with HARQ process J, and a second CG configuration (e.g., a third Tx or second "0" in [0303]) may be associated with HARQ process K. Thus, the fourth PUSCH 206 (actually two transmission occasions which just happen to occupy the same Orthogonal Frequency Division Multiplexing (OFDM) symbols) can be associated with HARQ processes {J, K}.

Thus, continuing the example cases from FIG. 1, FIG. 2 includes a fourth illustrated case in which a fourth PDCCH 204 for DG PUSCH Tx is received by the UE to schedule a fourth PUSCH 206 (PUSCH-4) at least N2 symbols after receiving the fourth PDCCH 204. Because fourth PDCCH 204 is received less than N2 symbols before the start of the CG transmission occasion 202, and because the fourth PUSCH 206 and the CG transmission occasion 202 both share the same HARQ process K, the fourth PUSCH 206 is not allowed.

In a fifth illustrated case, a fifth PDCCH 208 for DG PUSCH Tx is received by the UE to schedule a fifth PUSCH 210 (PUSCH-5) at least N2 symbols after receiving the fifth PDCCH 208. In this example, the fifth PUSCH 210 is for HARQ process ID W, which is not equal to HARQ process IDs J or K. Thus, even though the fifth PDCCH 208 is received after the decision point at time D, the fifth PUSCH 210 is allowed Many combinations of channel and/or data types may be considered for transmissions at different priorities. For example, FIG. 3 illustrates a table of example combinations of high priority (HP) and low priority (LP) channel and data type combinations according to certain embodiments. The table includes HP/LP combinations of DG PUSCH with uplink shared channel (UL-SCH), CG PUSCH, aperiodic CSI (A-CSI or AP-CSI) only over PUSCH, SP-CSI on PUSCH, PUCCH with scheduling request (SR), PUCCH with beam failure recovery (BFR) information, PUCCH with HARQ acknowledgment (HARQ-ACK) for DG PDSCH, PUCCH with HARQ-ACK for semi-persistent scheduling (SPS) PDSCH, and scheduled and/or SP (S/SP) CSI on PUCCH. In certain wireless communication systems, DG/CG override behavior may be defined or agreed to for the combinations illustrated with various shading or patterns. However, override behavior is not defined for combinations shown without highlighting or shading. As discussed in detail below, embodiments disclosed herein define override behavior for combination 302, combination 304, combination 306, combination 308, combination 310, combination 312, combination 314, combination 316, and combination 318.

In one embodiment, AP CSI only over PUSCH is treated as PUSCH with UL-SCH for DG/CG prioritization processing.

In another embodiment, for SP-CSI over PUSCH, the first transmission is treated as DG PUSCH and the rest of the transmission is treated as CG PUSCH transmission (as in transmission of CG PUSCH after CG activation).

In another embodiment, SP CSI over PUSCH is associated with a priority level, and DG/CG prioritization processing is used. In certain such embodiments, a UE may send a UE capability message to a base station to indicate support of SP CSI over PUSCH with priority. In addition, or in other embodiments, if the UE does not support a cancellation and replacement capability (e.g., in 3GPP Rel.-17), then UE behavior for DG/CG overriding (e.g., for 3GPP Rel.-16) is followed. On the other hand, if the UE supports the cancellation and replacement capability, then the UE behavior regarding cancellation and replacement of two PUSCHs with UL-SCH is as described in one or more embodiments described herein.

As shown in FIG. 3, the combination 302 corresponds to a high priority DG PUSCH with UL-SCH and a low priority SP-CSI on PUSCH. In one embodiment for the combination 302, HP DG PUSCH overrides SP-CSI on PUSCH as HP DG PUSCH overrides LP CG-PUSCH, but without any reference HARQ process ID because for SP-CSI there is no data transmission (and therefore no HARQ process). In another embodiment for the combination 302, if a semi-persistent CSI report to be carried on PUSCH overlaps in time with DG PUSCH with UL-SCH at high priority in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with the PUSCH carrying semi-persistent CSI report and the PUSCH with data transmission, the CSI report is not transmitted by the UE. Otherwise, if the timeline requirement is not satisfied, this is an error case.

The combination 304 corresponds to a high priority CG PUSCH and the low priority SP-CSI on PUSCH. In one embodiment for the 304, HP CG PUSCH overrides SP-CSI on PUSCH as HP CG PUSCH overrides LP CG-PUSCH, but without any reference to HARQ process ID. In another embodiment, if a semi-persistent CSI report to be carried on PUSCH overlaps in time with PUSCH data transmission in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with the PUSCH carrying semi-persistent CSI report and the PUSCH with data transmission, the CSI report is not transmitted by the UE. Otherwise, if the timeline requirement is not satisfied, this is an error case. In yet another embodiment, if a UE would transmit a first PUSCH that includes semi-persistent CSI reports and a second PUSCH that is a configured grant and the first PUSCH transmission would overlap in time with the second PUSCH transmission, the UE does not transmit the first PUSCH and transmits the second PUSCH if the first PUSCH's physical layer priority is not higher than the second PUSCH's physical layer priority. The UE expects that the first and second PUSCH transmissions satisfy the above timing conditions for PUSCH transmissions that overlap in time when at least one of the first or second PUSCH transmissions is in response to a DCI format detection by the UE.

The combination 306 corresponds to high priority A-CSI only over PUSCH and the low priority SP-CSI on PUSCH. In one embodiment for the combination 306, HP AP CSI on PUSCH overrides SP-CSI on PUSCH as HP DG PUSCH overrides LP CG-PUSCH, without any reference to HARQ process ID. In another embodiment, if a semi-persistent CSI report to be carried on PUSCH overlaps in time with HP PUSCH with AP CSI-only scheduled by a PDCCH in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with the PUSCH carrying semi-persistent CSI report and the PUSCH with data transmission, the CSI report not transmitted by the UE. Otherwise, if the timeline requirement is not satisfied, this is an error case.

The combination 308 corresponds to a high priority SP-CSI on PUSCH and the low priority SP-CSI on PUSCH. In one embodiment for the combination 308, HP SP CSI on PUSCH overrides LP (or no priority) SP-CSI on PUSCH as HP CG PUSCH overrides LP CG-PUSCH, without any reference to HARQ process ID. In another embodiment, if a UE would transmit a first PUSCH that includes semi-persistent CSI report(s) and a second PUSCH that includes semi-persistent CSI reports and the first PUSCH transmission would overlap in time with the second PUSCH transmission, the UE does not transmit the second PUSCH and transmits the first PUSCH if the first PUSCH's physical layer priority is higher than the second PUSCH's physical layer priority and neither the first PUSCH nor second PUSCH is the first PUSCH transmission at the activation of SP-CSI over PUSCH. If PUSCH A, which is either the first PUSCH or the second PUSCH and is the first PUSCH transmission at activation of SP-CSI on PUSCH, then PUSCH A can be transmitted and the other PUSCH (PUSCH B) is dropped. If PUSCH B, which is not the first PUSCH transmission at activation of SP-CSI over PUSCH overlaps in time with PUSCH A in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with PUSCH A and PUSCH B, PUSCH B is not transmitted by the UE. Otherwise, if the timeline requirement is not satisfied, this is an error case.

The combination 310 corresponds to the high priority CG PUSCH and a low priority A-CSI only over PUSCH. In one embodiment for the combination 310, HP SP CSI on PUSCH overrides LP (or no priority) AP-CSI on PUSCH as HP CG PUSCH overrides LP DG-PUSCH, without any reference to HARQ process ID. In an alternative embodiment, the LP DG PUSCH with AP-CSI can override the HP CG PUSCH as long as the Rel-15 timeline condition is met; and the HARQ process ID with the LP DG PUSCH is not checked with the HARQ process ID of the CG PUSCH to determine whether the LP DG PUSCH can be transmitted or not. In yet another embodiment, the LP DG PUSCH with AP-CSI can override the HP CG PUSCH as long as the Rel-15 timeline condition is met; A UE is not expected to be scheduled by a PDCCH ending in symbol i to transmit a PUSCH with AP-CSI on a given serving cell with a given HARQ process, if there is a transmission occasion where the UE is allowed to transmit a PUSCH with configured grant according to 3GPP TS38.321 with the same HARQ process on the same serving cell starting in a symbol j after symbol i, and if the gap between the end of PDCCH and the beginning of symbol j is less than $N_2$ symbols. The value $N_2$ in symbols is determined according to the UE processing capability defined in Clause 6.4 in TS 38.214, and $N_2$ and the symbol duration are based on the minimum of the subcarrier spacing corresponding to the PUSCH with configured grant and the subcarrier spacing of the PDCCH scheduling the PUSCH, even though in this case the HARQ process ID indicated in the DCI scheduling the LP DG PUSCH is not relevant to the PUSCH transmission itself as no UL-SCH is included.

The combination 312 corresponds to the high priority A-CSI only over PUSCH and a low priority CG PUSCH. In one embodiment for the combination 312, HP AP CSI on PUSCH overrides LP (or no priority) SP-CSI on PUSCH as HP DG PUSCH overrides LP CG-PUSCH, without any reference to HARQ process ID. In an alternative embodiment, the HP DG PUSCH with AP-CSI can override the LP CG PUSCH as long as the Rel-15 timeline condition is met; and the HARQ process ID with the HP DG PUSCH is not checked with the HARQ process ID of the CG PUSCH to determine whether the LP DG PUSCH can be transmitted or not. In yet another embodiment, the HP DG PUSCH with AP-CSI can override the LP CG PUSCH as long as the Rel-15 timeline condition is met; and A UE is not expected to be scheduled by a PDCCH ending in symbol i to transmit a PUSCH with AP-CSI on a given serving cell with a given HARQ process, if there is a transmission occasion where the UE is allowed to transmit a PUSCH with configured grant according to TS38.321 with the same HARQ process on the same serving cell starting in a symbol j after symbol i, and if the gap between the end of PDCCH and the beginning of symbol j is less than $N_2$ symbols. The value $N_2$ in symbols is determined according to the UE processing capability defined in Clause 6.4 in TS 38.214, and $N_2$ and the symbol duration are based on the minimum of the subcarrier spacing corresponding to the PUSCH with configured grant and the subcarrier spacing of the PDCCH scheduling the PUSCH, even though in this case the HARQ process ID indicated in the DCI scheduling the LP DG PUSCH is not relevant to the PUSCH transmission itself as no UL-SCH is included.

The combination 314 corresponds to the high priority SP-CSI on PUSCH and a low priority DG PUSCH with UL-SCH. In one embodiment, the combination 314 is not supported (e.g., for legacy systems that do not support high priority SP CSI over PUSCH). In another embodiment for the combination 314, HP SP CSI on PUSCH overrides LP (or no priority) DG PUSCH as HP CG PUSCH overrides LP DG-PUSCH, without any reference to HARQ process ID. In another embodiment, if a semi-persistent CSI report to be carried on PUSCH overlaps in time with PUSCH data transmission in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with the PUSCH carrying semi-persistent CSI report and the PUSCH with data transmission, the CSI report is not transmitted by the UE. Otherwise, if the timeline requirement is not satisfied, this is an error case.

The combination 316 corresponds to the high priority SP-CSI on PUSCH and the low priority CG PUSCH. In one embodiment, the combination 316 is not supported (e.g., for legacy systems that do not support high priority SP CSI over PUSCH). In another embodiment for the combination 316, HP SP CSI on PUSCH overrides LP (no priority) CG PUSCH as HP CG PUSCH overrides LP CG-PUSCH, without any reference to HARQ process ID. In an alternative embodiment, if a UE would transmit a first PUSCH that includes semi-persistent CSI report(s) and a second PUSCH that includes an UL-SCH (configured grant) and the first PUSCH transmission would overlap in time with the second PUSCH transmission, the UE does not transmit the second PUSCH and transmits the first PUSCH if 1) the first PUSCH's physical layer priority is higher than the second PUSCH's physical layer priority and 2) the first PUSCH is not the first PUSCH transmission at the activation of SP-CSI on PUSCH, and the second PUSCH is not the first PUSCH transmission at activation of CG PUSCH. For combination 316 and combination 304, if PUSCH A which is either SP-CSI on PUSCH or CG PUSCH is the first PUSCH transmission at activation of SP-CSI on PUSCH or CG PUSCH, then PUSCH A can be transmitted and PUSCH B which is either CG PUSCH or SP-CSI on PUSCH is dropped. If PUSCH B which is not the first PUSCH transmission at activation of CG PUSCH or SP-CSI over PUSCH overlaps in time with PUSCH A in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with PUSCH A and PUSCH B, PUSCH B shall not be transmitted by the UE. Otherwise, if the timeline requirement is not satisfied, this is an error case.

The combination 318 corresponds to the high priority SP-CSI on PUSCH and the low priority A-CSI only over PUSCH. In one embodiment, the combination 318 is not supported (e.g., for legacy systems that do not support high priority SP CSI over PUSCH). In another embodiment for the combination 318, HP SP CSI on PUSCH overrides LP (no priority) AP-CSI on PUSCH as HP CG PUSCH overrides LP DG-PUSCH, without any reference to HARQ process ID. In an alternative embodiment, if a semi-persistent CSI report to be carried on PUSCH overlaps in time with LP PUSCH including AP CSI-only scheduled by a PDCCH, in one or more symbols on the same carrier, and if the earliest symbol of these PUSCH channels starts no earlier than N2+d2,1 symbols after the last symbol of the DCI scheduling the PUSCH where d2,1 is the maximum of the d2,1 associated with the PUSCH carrying semi-persistent CSI report and the PUSCH with data transmission, the CSI report is not transmitted by the UE. Otherwise, if the timeline requirement is not satisfied, this is an error case.

Figure 4:
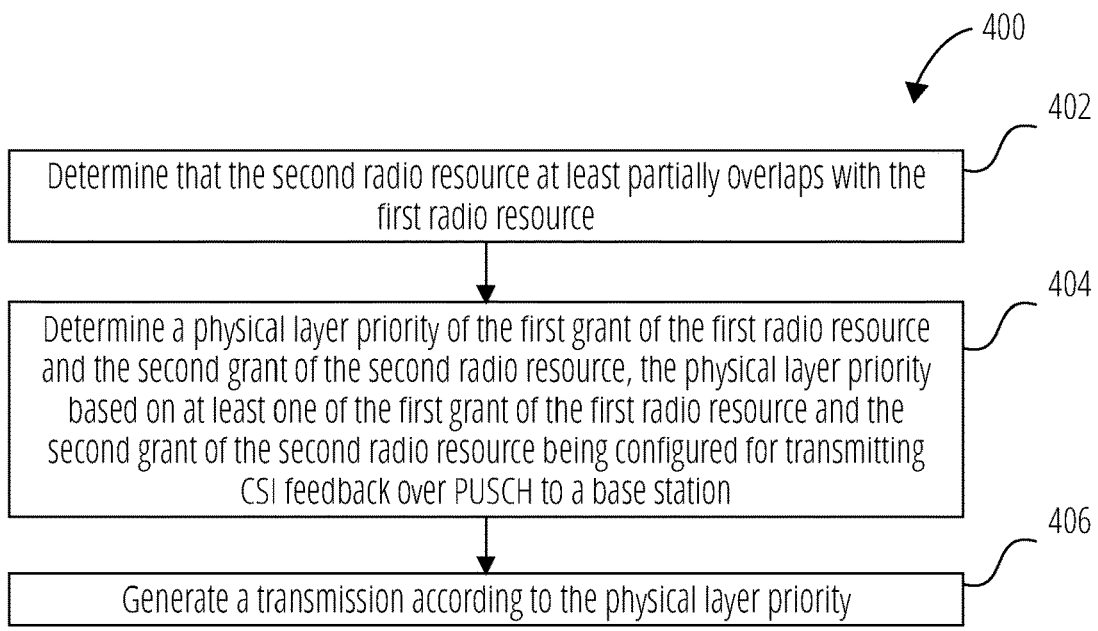
FIG. 4 illustrates a method for a UE in accordance with one embodiment.

FIG. 4 is a flowchart of a method 400 for a UE to control override of a first grant of a first radio resource by a second grant of a second radio resource. In block 402, the method 400 includes determining that the second radio resource at least partially overlaps with the first radio resource. In block 404, method 400 includes determining a physical layer priority of the first grant of the first radio resource and the second grant of the second radio resource, the physical layer priority based on at least one of the first grant of the first radio resource and the second grant of the second radio resource being configured for transmitting channel state information (CSI) feedback over a physical uplink shared channel (PUSCH) to a base station. In block 406, the method 400 includes generating a transmission according to the physical layer priority.

In certain embodiments of the method 400, the first grant comprises a configured grant (CG) for a semi-persistent (SP) CSI over the PUSCH and the second grant comprises a dynamic grant (DG) for the PUSCH with an uplink shared channel (UL-SCH). The SP CSI over the PUSCH is associated with a first priority level and the DG for the PUSCH with the UL-SCH is associated with a second priority level. Determining the physical layer priority comprises, in response to determining that the second priority level is higher than the first priority level, determining that the DG for the PUSCH with the UL-SCH overrides the SP CSI over the PUSCH.

In certain embodiments of the method 400, the first grant comprises a first configured grant (CG) for a semi-persistent (SP) CSI over the PUSCH and the second grant comprises a second CG for the PUSCH. The SP CSI over the PUSCH is associated with a first priority level and the second CG for the PUSCH is associated with a second priority level. Determining the physical layer priority comprises, in response to determining that the second priority level is higher than the first priority level, determining that the second CG for the PUSCH overrides the SP CSI over the PUSCH.

In certain embodiments of the method 400, the first grant comprises a configured grant (CG) for a semi-persistent (SP) CSI over the PUSCH and the second grant comprises a dynamic grant (DG) for an aperiodic (AP) CSI over the PUSCH. The SP CSI over the PUSCH is associated with a first priority level and the AP CSI over the PUSCH is associated with a second priority level. Determining the physical layer priority comprises, in response to determining that the second priority level is higher than the first priority level, determining that the AP CSI over the PUSCH overrides the SP CSI over the PUSCH.

In certain embodiments of the method 400, the first grant comprises a first configured grant (CG) for a first semi-persistent (SP) CSI over the PUSCH and the second grant comprises a second CG for a second SP CSI over the PUSCH. The first SP CSI over the PUSCH is associated with a first priority level and the second SP CSI over the PUSCH is associated with a second priority level. Determining the physical layer priority comprises, in response to determining that the second priority level is higher than the first priority level, determining that the second SP CSI over the PUSCH overrides the first SP CSI over the PUSCH.

In certain embodiments of the method 400, the first grant comprises a dynamic grant (DG) for an aperiodic (AP) CSI over the PUSCH and the second grant comprises a configured grant (CG) for the PUSCH. The AP CSI over the PUSCH is associated with a first priority level and the CG for the PUSCH is associated with a second priority level. Determining the physical layer priority comprises, in response to determining that the second priority level is higher than the first priority level, determining that the CG for the PUSCH overrides the AP CSI over the PUSCH. The CG for the PUSCH may be for transmission of a semi-persistent (SP) CSI over the PUSCH.

In certain embodiments of the method 400, the first grant comprises a configured grant (CG) for the PUSCH and the second grant comprises a dynamic grant (DG) for an aperiodic (AP) CSI over the PUSCH. The CG for the PUSCH is associated with a first priority level and the AP CSI over the PUSCH is associated with a second priority level. Determining the physical layer priority comprises, in response to determining that the second priority level is higher than the first priority level, determining that the AP CSI over the PUSCH overrides the CG for the PUSCH. The CG for the PUSCH may be for transmission of a semi-persistent (SP) CSI over the PUSCH.

In certain embodiments of the method 400, the first grant comprises a dynamic grant (DG) for the PUSCH with an uplink shared channel (UL-SCH) and the second grant comprises a configured grant for a semi-persistent (SP) CSI over the PUSCH. The DG for the PUSCH with the UL-SCH is associated with a first priority level and the SP CSI over the PUSCH is associated with a second priority level. Determining the physical layer priority comprises, in response to determining that the second priority level is higher than the first priority level, determining that the SP CSI over the PUSCH overrides the DG for the PUSCH with the UL-SCH.

In certain embodiments of the method 400, the first grant comprises a first configured grant (CG) for the PUSCH and the second grant comprises a second CG for a semi-persistent (SP) CSI over the PUSCH. The first CG for the PUSCH is associated with a first priority level and the SP CSI over the PUSCH is associated with a second priority level. Determining the physical layer priority comprises, in response to determining that the second priority level is higher than the first priority level, determining that the SP CSI over the PUSCH overrides the first CG for the PUSCH.

In certain embodiments of the method 400, the first grant comprises a dynamic grant (DG) for an aperiodic (AP) CSI over the PUSCH and the second grant comprises a configured grant (CG) for a semi-persistent (SP) CSI over the PUSCH. The AP CSI over the PUSCH is associated with a first priority level and the SP CSI over the PUSCH is associated with a second priority level. Determining the physical layer priority comprises, in response to determining that the second priority level is higher than the first priority level, determining that the SP CSI over the PUSCH overrides the AP CSI over the PUSCH.

In certain embodiments of the method 400, determining the physical layer priority is performed without any reference to a hybrid automatic repeat request (HARD) process identifier (ID).

In certain embodiments of the method 400, the CSI feedback comprises an aperiodic (AP) CSI over the PUSCH, and determining the physical layer priority comprises treating the AP CSI over the PUSCH as a PUSCH with uplink shared channel (UL-SCH) for dynamic grant (DG) and configured grant (CG) prioritization processing.

In certain embodiments of the method 400, the CSI feedback comprises a semi-persistent (SP) CSI over the PUSCH, and determining the physical layer priority comprises treating a first transmission of the SP CSI over the PUSCH as a dynamic grant (DG) PUSCH transmission and treating one or more second transmissions of the SP CSI over the PUSCH as a configured grant (CG) PUSCH transmission, wherein the one or more second transmissions are subsequent to the first transmission.

Figure 5:
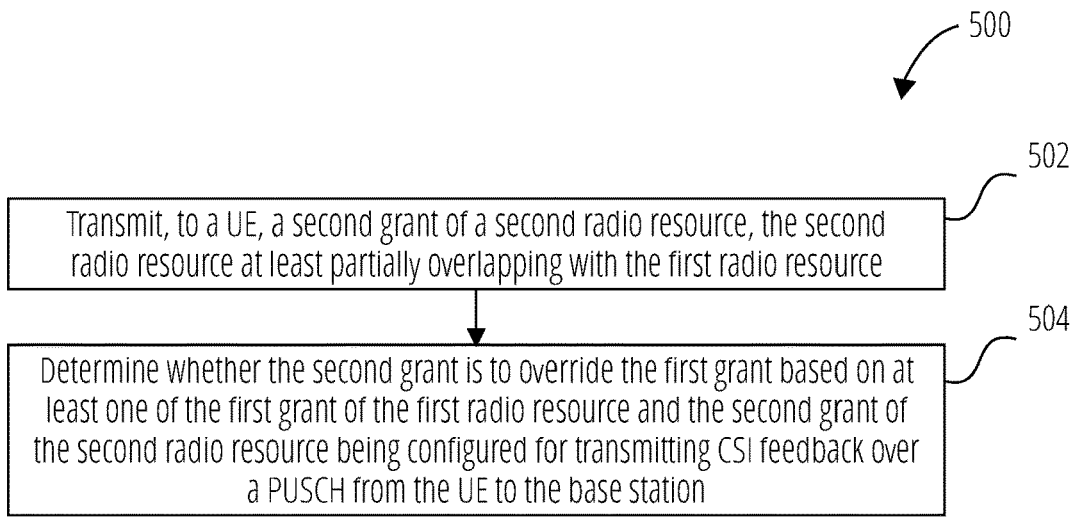
FIG. 5 illustrates a method for a base station in accordance with one embodiment.

FIG. 5 is a method 500 in base station for controlling override of a first grant of a first radio resource. In block 502, the method 500 includes transmitting, to a user equipment (UE), a second grant of a second radio resource, the second radio resource at least partially overlapping with the first radio resource. In block 504, the method 500 includes determining whether the second grant is to override the first grant based on at least one of the first grant of the first radio resource and the second grant of the second radio resource being configured for transmitting channel state information (CSI) feedback over a physical uplink shared channel (PUSCH) from the UE to the base station.

In certain embodiments of the method 500, the first grant comprises a configured grant (CG) for a semi-persistent (SP) CSI over the PUSCH and the second grant comprises a dynamic grant (DG) for the PUSCH with an uplink shared channel (UL-SCH). The SP CSI over the PUSCH is associated with a first priority level and the DG for the PUSCH with the UL-SCH is associated with a second priority level. Determining whether the second grant is to override the first grant comprises determining that the DG for the PUSCH with the UL-SCH overrides the SP CSI over the PUSCH.

In certain embodiments of the method 500, the first grant comprises a first configured grant (CG) for a semi-persistent (SP) CSI over the PUSCH and the second grant comprises a second CG for the PUSCH. The SP CSI over the PUSCH is associated with a first priority level and the second CG for the PUSCH is associated with a second priority level. Determining whether the second grant is to override the first grant comprises determining that the second CG for the PUSCH overrides the SP CSI over the PUSCH.

In certain embodiments of the method 500, the first grant comprises a configured grant (CG) for a semi-persistent (SP) CSI over the PUSCH and the second grant comprises a dynamic grant (DG) for an aperiodic (AP) CSI over the PUSCH. The SP CSI over the PUSCH is associated with a first priority level and the AP CSI over the PUSCH is associated with a second priority level. Determining whether the second grant is to override the first grant comprises determining that the AP CSI over the PUSCH overrides the SP CSI over the PUSCH.

In certain embodiments of the method 500, the first grant comprises a first configured grant (CG) for a first semi-persistent (SP) CSI over the PUSCH and the second grant comprises a second CG for a second SP CSI over the PUSCH. The first SP CSI over the PUSCH is associated with a first priority level and the second SP CSI over the PUSCH is associated with a second priority level. Determining whether the second grant is to override the first grant comprises determining that the second SP CSI over the PUSCH overrides the first SP CSI over the PUSCH.

In certain embodiments of the method 500, the first grant comprises a dynamic grant (DG) for an aperiodic (AP) CSI over the PUSCH and the second grant comprises a configured grant (CG) for the PUSCH. The AP CSI over the PUSCH is associated with a first priority level and the CG for the PUSCH is associated with a second priority level. Determining whether the second grant is to override the first grant comprises determining that the CG for the PUSCH overrides the AP CSI over the PUSCH.

In certain embodiments of the method 500, the first grant comprises a configured grant (CG) for the PUSCH and the second grant comprises a dynamic grant (DG) for an aperiodic (AP) CSI over the PUSCH. The CG for the PUSCH is associated with a first priority level and the AP CSI over the PUSCH is associated with a second priority level. Determining whether the second grant is to override the first grant comprises determining that the AP CSI over the PUSCH overrides the CG for the PUSCH.

In certain embodiments of the method 500, the first grant comprises a dynamic grant (DG) for the PUSCH with an uplink shared channel (UL-SCH) and the second grant comprises a configured grant for a semi-persistent (SP) CSI over the PUSCH. The DG for the PUSCH with the UL-SCH is associated with a first priority level and the SP CSI over the PUSCH is associated with a second priority level. Determining whether the second grant is to override the first grant comprises determining that the SP CSI over the PUSCH overrides the DG for the PUSCH with the UL-SCH.

In certain embodiments of the method 500, the first grant comprises a first configured grant (CG) for the PUSCH and the second grant comprises a second CG for a semi-persistent (SP) CSI over the PUSCH. The first CG for the PUSCH is associated with a first priority level and the SP CSI over the PUSCH is associated with a second priority level. Determining whether the second grant is to override the first grant comprises determining that the SP CSI over the PUSCH overrides the first CG for the PUSCH.

In certain embodiments of the method 500, the first grant comprises a dynamic grant (DG) for an aperiodic (AP) CSI over the PUSCH and the second grant comprises a configured grant (CG) for a semi-persistent (SP) CSI over the PUSCH. The AP CSI over the PUSCH is associated with a first priority level and the SP CSI over the PUSCH is associated with a second priority level. Determining whether the second grant is to override the first grant comprises determining that the SP CSI over the PUSCH overrides the AP CSI over the PUSCH.

In certain embodiments of the method 500, the determining whether the second grant is to override the first grant is performed without any reference to a hybrid automatic repeat request (HARM) process identifier (ID).

Figure 6:
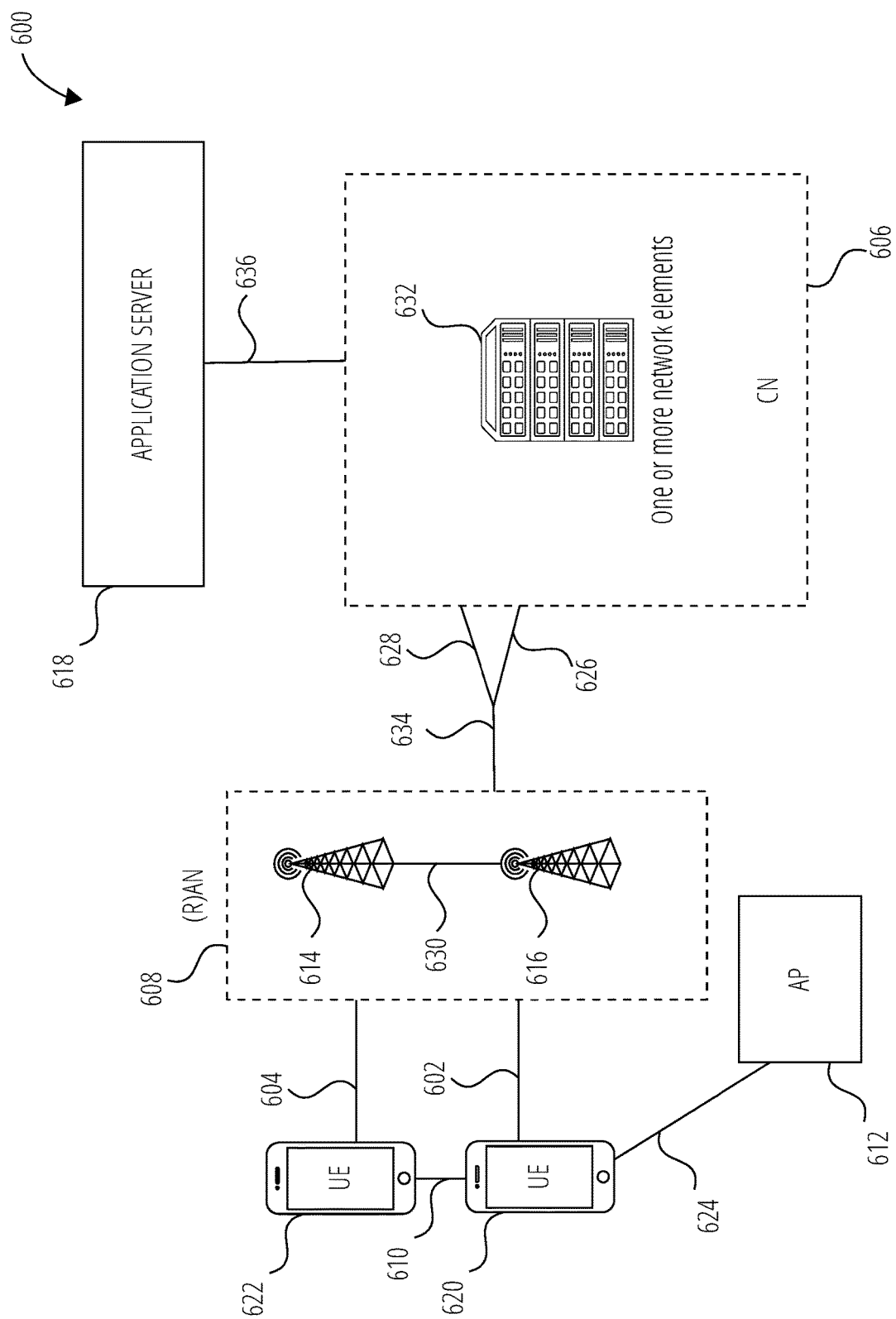
FIG. 6 illustrates a system in accordance with one embodiment.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 622 and UE 620. In this example, the UE 622 and the UE 620 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 622 and/or the UE 620 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 622 and UE 620 may be configured to connect, for example, communicatively couple, with an access node or radio access node (shown as (R)AN 608). In embodiments, the (R)AN 608 may be an NG RAN or a SG RAN, an E-UTRAN, or a legacy RAN, such as a UTRAN or GERAN. As used herein, the term "NG RAN" or the like may refer to a (R)AN 608 that operates in an NR or SG system, and the term "E-UTRAN" or the like may refer to a (R)AN 608 that operates in an LTE or 4G system. The UE 622 and UE 620 utilize connections (or channels) (shown as connection 604 and connection 602, respectively), each of which comprises a physical communications interface or layer (discussed in further detail below).

In this example, the connection 604 and connection 602 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 622 and UE 620 may directly exchange communication data via a ProSe interface 610. The ProSe interface 610 may alternatively be referred to as a sidelink (SL) interface 110 and may comprise one or more logical channels, including but not limited to a PSCCH, a PSSCH, a PSDCH, and a PSBCH.

The UE 620 is shown to be configured to access an AP 612 (also referred to as "WLAN node," "WLAN," "WLAN Termination," "WT" or the like) via connection 624. The connection 624 can comprise a local wireless connection, such as a connection consistent with any IEEE 802.11 protocol, wherein the AP 612 would comprise a wireless fidelity (Wi-Fi®) router. In this example, the AP 612 may be connected to the Internet without connecting to the core network of the wireless system (described in further detail below). In various embodiments, the UE 620, (R)AN 608, and AP 612 may be configured to utilize LWA operation and/or LWIP operation. The LWA operation may involve the UE 620 in RRC_CONNECTED being configured by the RAN node 614 or the RAN node 616 to utilize radio resources of LTE and WLAN. LWIP operation may involve the UE 620 using WLAN radio resources (e.g., connection 624) via IPsec protocol tunneling to authenticate and encrypt packets (e.g., IP packets) sent over the connection 624. IPsec tunneling may include encapsulating the entirety of original IP packets and adding a new packet header, thereby protecting the original header of the IP packets.

The (R)AN 608 can include one or more AN nodes, such as RAN node 614 and RAN node 616, that enable the connection 604 and connection 602. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 600 (e.g., an eNB). According to various embodiments, the RAN node 614 or RAN node 616 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 614 or RAN node 616 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 614 or RAN node 616); a MAC/PHY split wherein RRC, PDCP, RLC, and MAC layers are operated by the CRAN/vBBUP and the PHY layer is operated by individual RAN nodes (e.g., RAN node 614 or RAN node 616); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 614 or RAN node 616 to perform other virtualized applications. In some implementations, an individual RAN node may represent individual gNB-DUs that are connected to a gNB-CU via individual F1 interfaces (not shown by FIG. 6). In these implementations, the gNB-DUs may include one or more remote radio heads or RFEMs, and the gNB-CU may be operated by a server that is located in the (R)AN 608 (not shown) or by a server pool in a similar manner as the CRAN/vBBUP. Additionally, or alternatively, one or more of the RAN node 614 or RAN node 616 may be next generation eNBs (ng-eNBs), which are RAN nodes that provide E-UTRA user plane and control plane protocol terminations toward the UE 622 and UE 620, and are connected to an SGC via an NG interface (discussed infra). In V2X scenarios one or more of the RAN node 614 or RAN node 616 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 614 and/or the RAN node 616 can terminate the air interface protocol and can be the first point of contact for the UE 622 and UE 620. In some embodiments, the RAN node 614 and/or the RAN node 616 can fulfill various logical functions for the (R)AN 608 including, but not limited to, radio network controller (RNC) functions such as radio bearer management, uplink and downlink dynamic radio resource management and data packet scheduling, and mobility management.

In embodiments, the UE 622 and UE 620 can be configured to communicate using OFDM communication signals with each other or with the RAN node 614 and/or the RAN node 616 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 614 and/or the RAN node 616 to the UE 622 and UE 620, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 622 and UE 620 and the RAN node 614 and/or the RAN node 616 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 622 and UE 620 and the RAN node 614 or RAN node 616 may operate using LAA, eLAA, and/or feLAA mechanisms. In these implementations, the UE 622 and UE 620 and the RAN node 614 or RAN node 616 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 622 and UE 620, RAN node 614 or RAN node 616, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 622, AP 612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µB); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 622 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 622 and UE 620. The PDCCH carries information about the transport format and resource allocations related to the PDSCH channel, among other things. It may also inform the UE 622 and UE 620 about the transport format, resource allocation, and HARQ information related to the uplink shared channel. Typically, downlink scheduling (assigning control and shared channel resource blocks to the UE 620 within a cell) may be performed at any of the RAN node 614 or RAN node 616 based on channel quality information fed back from any of the UE 622 and UE 620. The downlink resource assignment information may be sent on the PDCCH used for (e.g., assigned to) each of the UE 622 and UE 620.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 614 or RAN node 616 may be configured to communicate with one another via interface 630. In embodiments where the system 600 is an LTE system (e.g., when CN 606 is an EPC), the interface 630 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 622 from an SeNB for user data; information of PDCP PDUs that were not delivered to a UE 622; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system (e.g., when CN 606 is an 5GC), the interface 630 may be an Xn interface. The Xn interface is defined between two or more RAN nodes (e.g., two or more gNBs and the like) that connect to 5GC, between a RAN node 614 (e.g., a gNB) connecting to 5GC and an eNB, and/or between two eNBs connecting to 5GC (e.g., CN 606). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 622 in a connected mode (e.g., CM-CONNECTED) including functionality to manage the UE mobility for connected mode between one or more RAN node 614 or RAN node 616. The mobility support may include context transfer from an old (source) serving RAN node 614 to new (target) serving RAN node 616; and control of user plane tunnels between old (source) serving RAN node 614 to new (target) serving RAN node 616. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 608 is shown to be communicatively coupled to a core network-in this embodiment, CN 606. The CN 606 may comprise one or more network elements 632, which are configured to offer various data and telecommunications services to customers/subscribers (e.g., users of UE 622 and UE 620) who are connected to the CN 606 via the (R)AN 608. The components of the CN 606 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 606 may be referred to as a network slice, and a logical instantiation of a portion of the CN 606 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 618 may be an element offering applications that use IP bearer resources with the core network (e.g., UMTS PS domain, LTE PS data services, etc.). The application server 618 can also be configured to support one or more communication services (e.g., VoIP sessions, PTT sessions, group communication sessions, social networking services, etc.) for the UE 622 and UE 620 via the EPC. The application server 618 may communicate with the CN 606 through an IP communications interface 636.

In embodiments, the CN 606 may be an 5GC, and the (R)AN 116 may be connected with the CN 606 via an NG interface 634. In embodiments, the NG interface 634 may be split into two parts, an NG user plane (NG-U) interface 626, which carries traffic data between the RAN node 614 or RAN node 616 and a UPF, and the S1 control plane (NG-C) interface 628, which is a signaling interface between the RAN node 614 or RAN node 616 and AMFs.

In embodiments, the CN 606 may be a 5G CN, while in other embodiments, the CN 606 may be an EPC). Where CN 606 is an EPC, the (R)AN 116 may be connected with the CN 606 via an S1 interface 634. In embodiments, the S1 interface 634 may be split into two parts, an S1 user plane (S1-U) interface 626, which carries traffic data between the RAN node 614 or RAN node 616 and the S-GW, and the S1-MME interface 628, which is a signaling interface between the RAN node 614 or RAN node 616 and MMEs.

Figure 7:
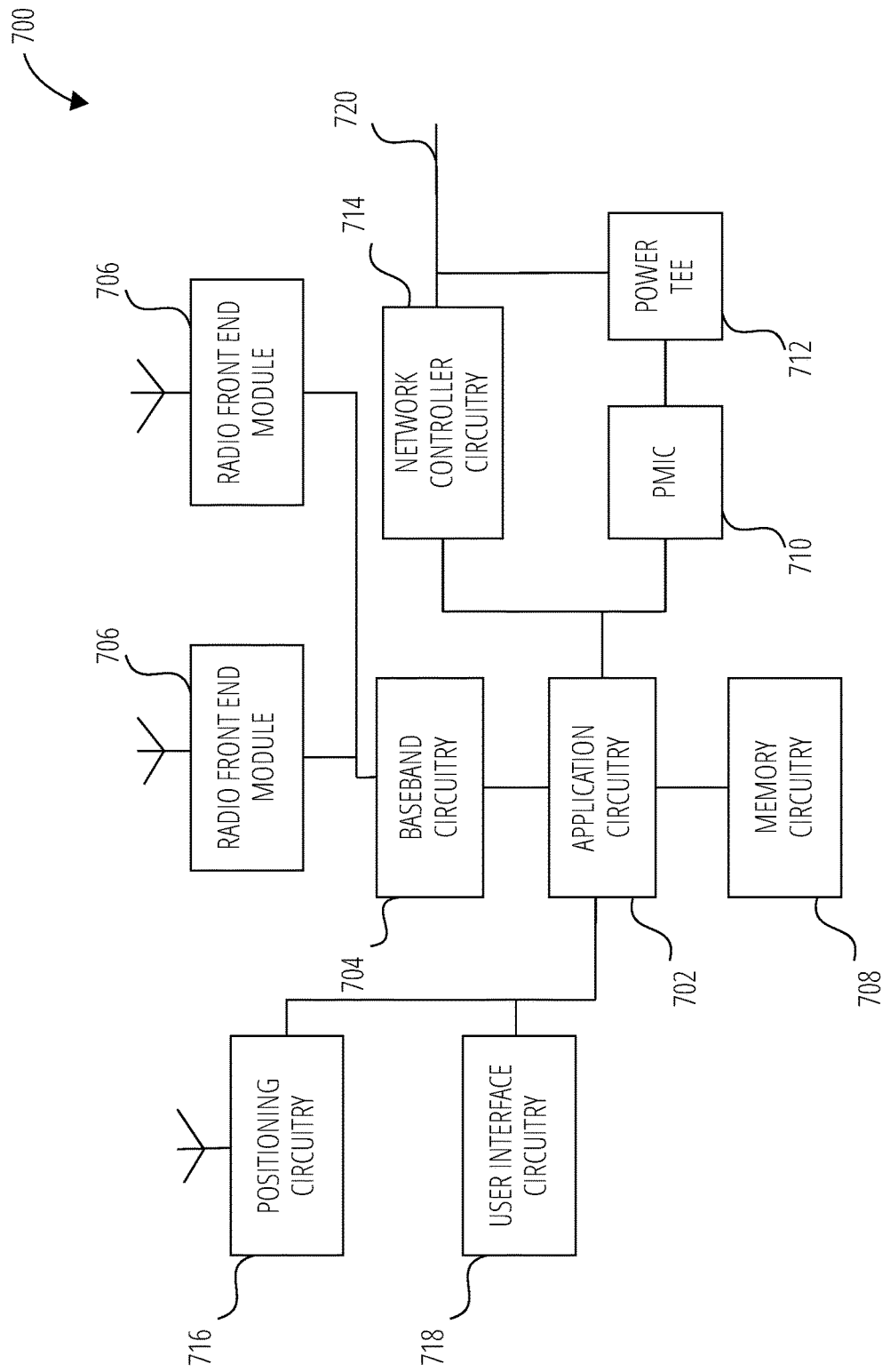
FIG. 7 illustrates an infrastructure equipment in accordance with one embodiment.

FIG. 7 illustrates an example of infrastructure equipment 700 in accordance with various embodiments. The infrastructure equipment 700 may be implemented as a base station, radio head, RAN node, AN, application server, and/or any other element/device discussed herein. In other examples, the infrastructure equipment 700 could be implemented in or by a UE.

The infrastructure equipment 700 includes application circuitry 702, baseband circuitry 704, one or more radio front end module 706 (RFEM), memory circuitry 708, power management integrated circuitry (shown as PMIC 710), power tee circuitry 712, network controller circuitry 714, network interface connector 720, satellite positioning circuitry 716, and user interface circuitry 718. In some embodiments, the device infrastructure equipment 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 702 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 702 may be coupled with or may include memory/storage elements and may be configured to execute instructions stored in the memory/storage to enable various applications or operating systems to run on the infrastructure equipment 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 702 may comprise, or may be, a special-purpose processor/controller to operate according to the various embodiments herein. As examples, the processor(s) of application circuitry 702 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 700 may not utilize application circuitry 702, and instead may include a special-purpose processor/controller to process IP data received from an EPC or 5GC, for example.

In some implementations, the application circuitry 702 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 704 may be implemented, for example, as a solder-down substrate including one or more integrated circuits, a single packaged integrated circuit soldered to a main circuit board or a multi-chip module containing two or more integrated circuits.

The user interface circuitry 718 may include one or more user interfaces designed to enable user interaction with the infrastructure equipment 700 or peripheral component interfaces designed to enable peripheral component interaction with the infrastructure equipment 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 708 may be implemented as one or more of solder down packaged integrated circuits, socketed memory modules and plug-in memory cards.

The PMIC 710 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 712 may provide for electrical power drawn from a network cable to provide both power supply and data connectivity to the infrastructure equipment 700 using a single cable.

The network controller circuitry 714 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 720 using a physical connection, which may be electrical (commonly referred to as a "copper interconnect"), optical, or wireless. The network controller circuitry 714 may include one or more dedicated processors and/or FPGAs to communicate using one or more of the aforementioned protocols. In some implementations, the network controller circuitry 714 may include multiple controllers to provide connectivity to other networks using the same or different protocols.

The positioning circuitry 716 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 716 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 716 may include a Micro-Technology for Positioning, Navigation, and Timing (Micro-PNT) IC that uses a master timing clock to perform position tracking/estimation without GNSS assistance. The positioning circuitry 716 may also be part of, or interact with, the baseband circuitry 704 and/or radio front end module 706 to communicate with the nodes and components of the positioning network. The positioning circuitry 716 may also provide position data and/or time data to the application circuitry 702, which may use the data to synchronize operations with various infrastructure, or the like. The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 8:
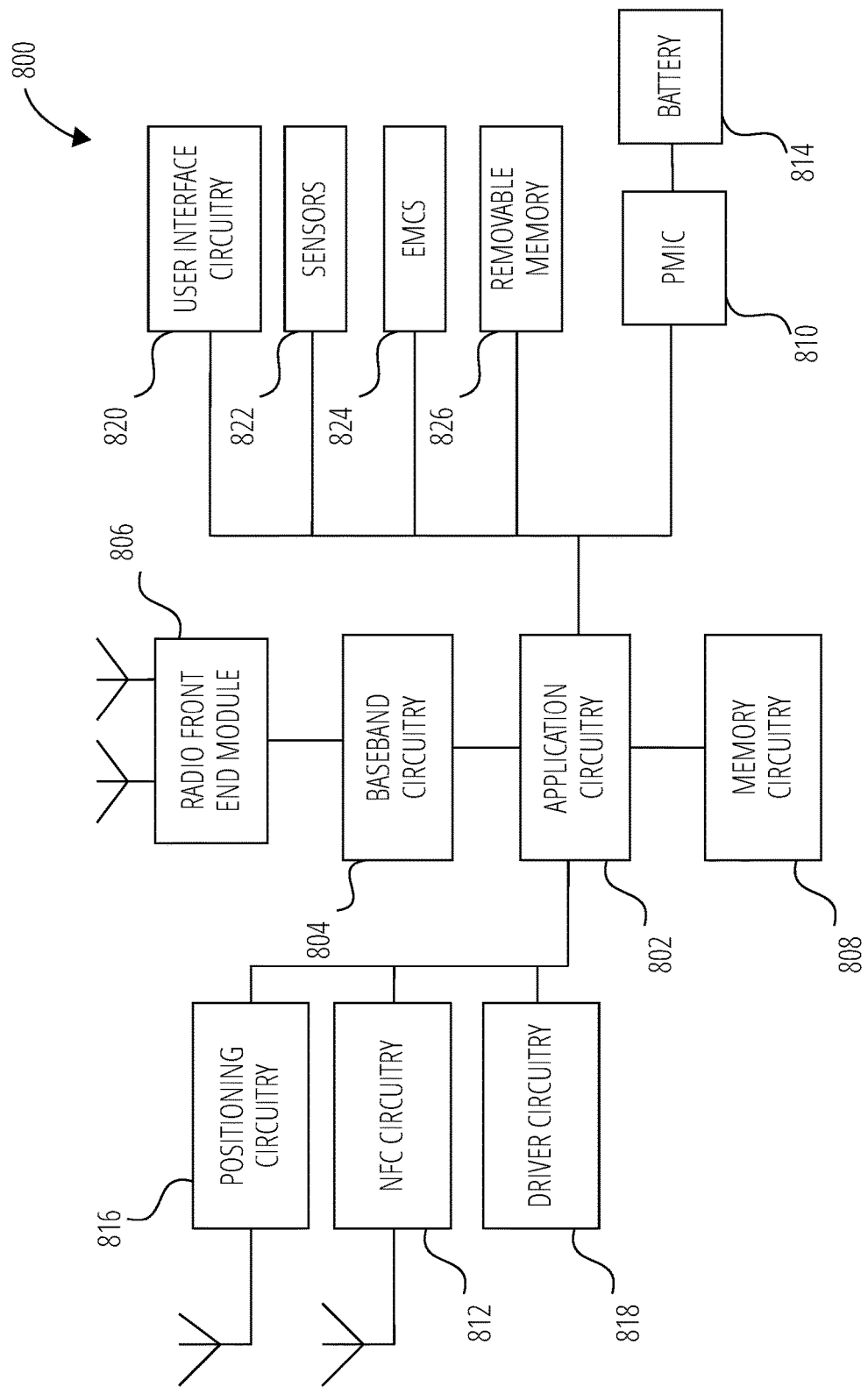
FIG. 8 illustrates a platform in accordance with one embodiment.

FIG. 8 illustrates an example of a platform 800 in accordance with various embodiments. In embodiments, the computer platform 800 may be suitable for use as UEs, application servers, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 802 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 802 may be coupled with or may include memory/storage elements and may be configured to execute instructions stored in the memory/storage to enable various applications or operating systems to run on the platform 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 802 may comprise, or may be, a special-purpose processor/controller to operate according to the various embodiments herein.

As examples, the processor(s) of application circuitry 802 may include an Intel® Architecture Core™ based processor, such as a Quark™, an Atom™, an i3, an i5, an i7, or an MCU-class processor, or another such processor available from Intel® Corporation. The processors of the application circuitry 802 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 802 may be a part of a system on a chip (SoC) in which the application circuitry 802 and other components are formed into a single integrated circuit, or a single package, such as the Edison™ or Galileo™ SoC boards from Intel® Corporation.

Additionally or alternatively, application circuitry 802 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 804 may be implemented, for example, as a solder-down substrate including one or more integrated circuits, a single packaged integrated circuit soldered to a main circuit board or a multi-chip module containing two or more integrated circuits.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 806, which incorporates both mmWave antennas and sub-mmWave.

The memory circuitry 808 may include any number and type of memory devices used to provide for a given amount of system memory. As examples, the memory circuitry 808 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 808 may be developed in accordance with a Joint Electron Devices Engineering Council (JEDEC) low power double data rate (LPDDR)-based design, such as LPDDR2, LPDDR3, LPDDR4, or the like. Memory circuitry 808 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 808 maybe on-die memory or registers associated with the application circuitry 802. To provide for persistent storage of information such as data, applications, operating systems and so forth, memory circuitry 808 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 800 may incorporate the three-dimensional (3D) cross-point (XPOINT) memories from Intel® and Micron®.

The removable memory 826 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensors 822 and electro-mechanical components (shown as EMCs 824), as well as removable memory devices coupled to removable memory 826.

The sensors 822 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 824 include devices, modules, or subsystems whose purpose is to enable platform 800 to change its state, position, and/or orientation, or move or control a mechanism or (sub)system. Additionally, EMCs 824 may be configured to generate and send messages/signaling to other components of the platform 800 to indicate a current state of the EMCs 824. Examples of the EMCs 824 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 824 based on one or more captured events and/or instructions or control signals received from a service provider and/or various clients. In some implementations, the interface circuitry may connect the platform 800 with positioning circuitry 816. The positioning circuitry 816 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 816 may include a Micro-PNT IC that uses a master timing clock to perform position tracking/estimation without GNSS assistance. The positioning circuitry 816 may also be part of, or interact with, the baseband circuitry 804 and/or radio front end module 806 to communicate with the nodes and components of the positioning network. The positioning circuitry 816 may also provide position data and/or time data to the application circuitry 802, which may use the data to synchronize operations with various infrastructure (e.g., radio base stations), for turn-by-turn navigation applications, or the like.

In some implementations, the interface circuitry may connect the platform 800 with Near-Field Communication circuitry (shown as NFC circuitry 812). The NFC circuitry 812 is configured to provide contactless, short-range communications based on radio frequency identification (RFID) standards, wherein magnetic field induction is used to enable communication between NFC circuitry 812 and NFC-enabled devices external to the platform 800 (e.g., an "NFC touchpoint"). NFC circuitry 812 comprises an NFC controller coupled with an antenna element and a processor coupled with the NFC controller. The NFC controller may be a chip/IC providing NFC functionalities to the NFC circuitry 812 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 812, or initiate data transfer between the NFC circuitry 812 and another active NFC device (e.g., a smartphone or an NFC-enabled POS terminal) that is proximate to the platform 800.

The driver circuitry 818 may include software and hardware elements that operate to control particular devices that are embedded in the platform 800, attached to the platform 800, or otherwise communicatively coupled with the platform 800. The driver circuitry 818 may include individual drivers allowing other components of the platform 800 to interact with or control various input/output (I/O) devices that may be present within, or connected to, the platform 800. For example, driver circuitry 818 may include a display driver to control and allow access to a display device, a touchscreen driver to control and allow access to a touchscreen interface of the platform 800, sensor drivers to obtain sensor readings of sensors 822 and control and allow access to sensors 822, EMC drivers to obtain actuator positions of the EMCs 824 and/or control and allow access to the EMCs 824, a camera driver to control and allow access to an embedded image capture device, audio drivers to control and allow access to one or more audio devices.

The power management integrated circuitry (shown as PMIC 810) (also referred to as "power management circuitry") may manage power provided to various components of the platform 800. In particular, with respect to the baseband circuitry 804, the PMIC 810 may control power-source selection, voltage scaling, battery charging, or DC-to-DC conversion. The PMIC 810 may often be included when the platform 800 is capable of being powered by a battery 814, for example, when the device is included in a UE.

In some embodiments, the PMIC 810 may control, or otherwise be part of, various power saving mechanisms of the platform 800. For example, if the platform 800 is in an RRC Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 814 may power the platform 800, although in some examples the platform 800 may be mounted deployed in a fixed location, and may have a power supply coupled to an electrical grid. The battery 814 may be a lithium ion battery, a metal-air battery, such as a zinc-air battery, an aluminum-air battery, a lithium-air battery, and the like. In some implementations, such as in V2X applications, the battery 814 may be a typical lead-acid automotive battery.

In some implementations, the battery 814 may be a "smart battery," which includes or is coupled with a Battery Management System (BMS) or battery monitoring integrated circuitry. The BMS may be included in the platform 800 to track the state of charge (SoCh) of the battery 814. The BMS may be used to monitor other parameters of the battery 814 to provide failure predictions, such as the state of health (SoH) and the state of function (SoF) of the battery 814. The BMS may communicate the information of the battery 814 to the application circuitry 802 or other components of the platform 800. The BMS may also include an analog-to-digital (ADC) convertor that allows the application circuitry 802 to directly monitor the voltage of the battery 814 or the current flow from the battery 814. The battery parameters may be used to determine actions that the platform 800 may perform, such as transmission frequency, network operation, sensing frequency, and the like.

A power block, or other power supply coupled to an electrical grid may be coupled with the BMS to charge the battery 814. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 814, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 820 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 820 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensors 822 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 9:
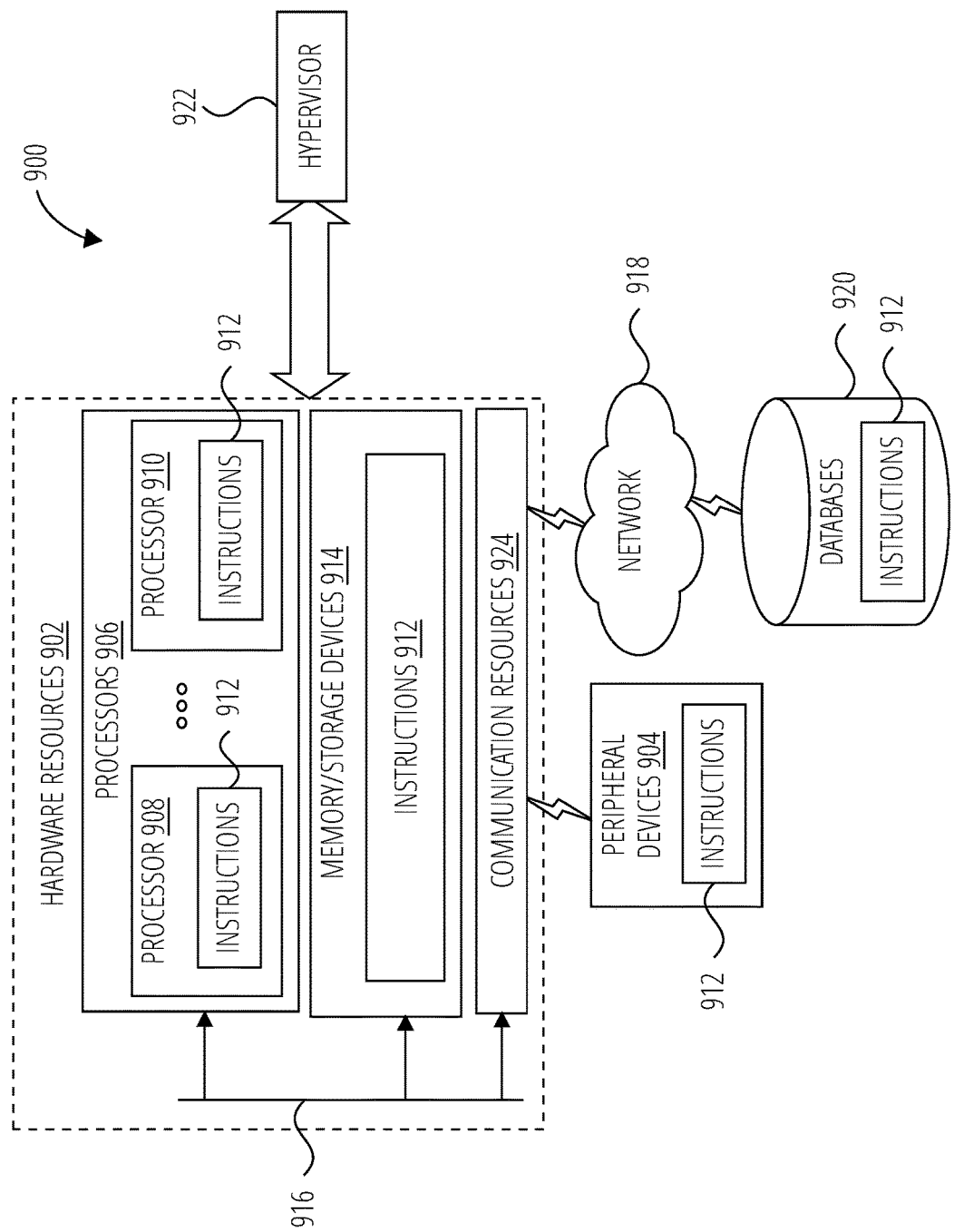
FIG. 9 illustrates components in accordance with one embodiment.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 906 (or processor cores), one or more memory/storage devices 914, and one or more communication resources 924, each of which may be communicatively coupled via a bus 916. For embodiments where node virtualization (e.g., NFV) is utilized, a hypervisor 922 may be executed to provide an execution environment for one or more network slices/sub-slices to utilize the hardware resources 902.

The processors 906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 908 and a processor 910.

The memory/storage devices 914 may include main memory, disk storage, or any suitable combination thereof.

The memory/storage devices 914 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 924 may include interconnection or network interface components or other suitable devices to communicate with one or more peripheral devices 904 or one or more databases 920 via a network 918. For example, the communication resources 924 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 912 may comprise software, a program, an application, an applet, an app, or other executable code for causing at least any of the processors 906 to perform any one or more of the methodologies discussed herein. The instructions 912 may reside, completely or partially, within at least one of the processors 906 (e.g., within the processor's cache memory), the memory/storage devices 914, or any suitable combination thereof. Furthermore, any portion of the instructions 912 may be transferred to the hardware resources 902 from any combination of the peripheral devices 904 or the databases 920.

Accordingly, the memory of the processors 906, the memory/storage devices 914, the peripheral devices 904, and the databases 920 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a user equipment (UE) to control override of a first grant of a first radio resource by a second grant of a second radio resource. The method includes: determining that the second radio resource at least partially overlaps with the first radio resource; determining a physical layer priority of the first grant of the first radio resource and the second grant of the second radio resource, the physical layer priority based on at least one of the first grant of the first radio resource and the second grant of the second radio resource being configured for transmitting channel state information (CSI) feedback over a physical uplink shared channel (PUSCH) to a base station; and generating a transmission according to the physical layer priority.

Example 2 includes the method of Example 1, wherein the first grant comprises a configured grant (CG) for a semi-persistent (SP) CSI over the PUSCH and the second grant comprises a dynamic grant (DG) for the PUSCH with an uplink shared channel (UL-SCH), wherein the SP CSI over the PUSCH is associated with a first priority level and the DG for the PUSCH with the UL-SCH is associated with a second priority level, and wherein determining the physical layer priority comprises, in response to determining that the second priority level is higher than the first priority level, determining that the DG for the PUSCH with the UL-SCH overrides the SP CSI over the PUSCH.

Example 3 includes the method of Example 1, wherein the first grant comprises a first configured grant (CG) for a semi-persistent (SP) CSI over the PUSCH and the second grant comprises a second CG for the PUSCH, wherein the SP CSI over the PUSCH is associated with a first priority level and the second CG for the PUSCH is associated with a second priority level, and wherein determining the physical layer priority comprises, in response to determining that the second priority level is higher than the first priority level, determining that the second CG for the PUSCH overrides the SP CSI over the PUSCH.

Example 4 includes the method of Example 1, wherein the first grant comprises a configured grant (CG) for a semi-persistent (SP) CSI over the PUSCH and the second grant comprises a dynamic grant (DG) for an aperiodic (AP) CSI over the PUSCH, wherein the SP CSI over the PUSCH is associated with a first priority level and the AP CSI over the PUSCH is associated with a second priority level, and wherein determining the physical layer priority comprises, in response to determining that the second priority level is higher than the first priority level, determining that the AP CSI over the PUSCH overrides the SP CSI over the PUSCH.

Example 5 includes the method of Example 1, wherein the first grant comprises a first configured grant (CG) for a first semi-persistent (SP) CSI over the PUSCH and the second grant comprises a second CG for a second SP CSI over the PUSCH, wherein the first SP CSI over the PUSCH is associated with a first priority level and the second SP CSI over the PUSCH is associated with a second priority level, and wherein determining the physical layer priority comprises, in response to determining that the second priority level is higher than the first priority level, determining that the second SP CSI over the PUSCH overrides the first SP CSI over the PUSCH.

Example 6 includes the method of Example 1, wherein the first grant comprises a dynamic grant (DG) for an aperiodic (AP) CSI over the PUSCH and the second grant comprises a configured grant (CG) for the PUSCH, wherein the AP CSI over the PUSCH is associated with a first priority level and the CG for the PUSCH is associated with a second priority level, and wherein determining the physical layer priority comprises, in response to determining that the second priority level is higher than the first priority level, determining that the CG for the PUSCH overrides the AP CSI over the PUSCH.

Example 7 includes the method of Example 1, wherein the first grant comprises a configured grant (CG) for the PUSCH and the second grant comprises a dynamic grant (DG) for an aperiodic (AP) CSI over the PUSCH, wherein the CG for the PUSCH is associated with a first priority level and the AP CSI over the PUSCH is associated with a second priority level, and wherein determining the physical layer priority comprises, in response to determining that the second priority level is higher than the first priority level, determining that the AP CSI over the PUSCH overrides the CG for the PUSCH.

Example 8 includes the method of Example 1, wherein the first grant comprises a dynamic grant (DG) for the PUSCH with an uplink shared channel (UL-SCH) and the second grant comprises a configured grant for a semi-persistent (SP) CSI over the PUSCH, wherein the DG for the PUSCH with the UL-SCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the DG for the PUSCH with the UL-SCH.

Example 9 includes the method of Example 1, wherein the first grant comprises a first configured grant (CG) for the PUSCH and the second grant comprises a second CG for a semi-persistent (SP) CSI over the PUSCH, wherein the first CG for the PUSCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the first CG for the PUSCH.

Example 10 includes the method of Example 1, wherein the first grant comprises a dynamic grant (DG) for an aperiodic (AP) CSI over the PUSCH and the second grant comprises a configured grant (CG) for a semi-persistent (SP) CSI over the PUSCH, wherein the AP CSI over the PUSCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the AP CSI over the PUSCH.

Example 11 includes the method of any one of Example 2 to Example 10, wherein determining the physical layer priority is performed without any reference to a hybrid automatic repeat request (HARQ) process identifier (ID).

Example 12 includes the method of any of Example 6 or Example 7, wherein the CG for the PUSCH is for transmission of a semi-persistent (SP) CSI over the PUSCH.

Example 13 includes the method of Example 1, wherein the CSI feedback comprises an aperiodic (AP) CSI over the PUSCH, and wherein determining the physical layer priority comprises treating the AP CSI over the PUSCH as a PUSCH with uplink shared channel (UL-SCH) for dynamic grant (DG) and configured grant (CG) prioritization processing.

Example 14 includes the method of Example 1, wherein the CSI feedback comprises a semi-persistent (SP) CSI over the PUSCH, and wherein determining the physical layer priority comprises treating a first transmission of the SP CSI over the PUSCH as a dynamic grant (DG) PUSCH transmission and treating one or more second transmissions of the SP CSI over the PUSCH as a configured grant (CG) PUSCH transmission, wherein the one or more second transmissions are subsequent to the first transmission.

Example 15 is a method in base station for controlling override of a first grant of a first radio resource. The method includes: transmitting, to a user equipment (UE), a second grant of a second radio resource, the second radio resource at least partially overlapping with the first radio resource; and determining whether the second grant is to override the first grant based on at least one of the first grant of the first radio resource and the second grant of the second radio resource being configured for transmitting channel state information (CSI) feedback over a physical uplink shared channel (PUSCH) from the UE to the base station.

Example 16 includes the method of Example 15, wherein the first grant comprises a configured grant (CG) for a semi-persistent (SP) CSI over the PUSCH and the second grant comprises a dynamic grant (DG) for the PUSCH with an uplink shared channel (UL-SCH), wherein the SP CSI over the PUSCH is associated with a first priority level and the DG for the PUSCH with the UL-SCH is associated with a second priority level, and wherein determining whether the second grant is to override the first grant comprises determining that the DG for the PUSCH with the UL-SCH overrides the SP CSI over the PUSCH.

Example 17 includes the method of Example 15, wherein the first grant comprises a first configured grant (CG) for a semi-persistent (SP) CSI over the PUSCH and the second grant comprises a second CG for the PUSCH, wherein the SP CSI over the PUSCH is associated with a first priority level and the second CG for the PUSCH is associated with a second priority level, and wherein determining whether the second grant is to override the first grant comprises determining that the second CG for the PUSCH overrides the SP CSI over the PUSCH.

Example 18 includes the method of Example 15, wherein the first grant comprises a configured grant (CG) for a semi-persistent (SP) CSI over the PUSCH and the second grant comprises a dynamic grant (DG) for an aperiodic (AP) CSI over the PUSCH, wherein the SP CSI over the PUSCH is associated with a first priority level and the AP CSI over the PUSCH is associated with a second priority level, and wherein determining whether the second grant is to override the first grant comprises determining that the AP CSI over the PUSCH overrides the SP CSI over the PUSCH.

Example 19 includes the method of Example 15, wherein the first grant comprises a first configured grant (CG) for a first semi-persistent (SP) CSI over the PUSCH and the second grant comprises a second CG for a second SP CSI over the PUSCH, wherein the first SP CSI over the PUSCH is associated with a first priority level and the second SP CSI over the PUSCH is associated with a second priority level, and wherein determining whether the second grant is to override the first grant comprises determining that the second SP CSI over the PUSCH overrides the first SP CSI over the PUSCH.

Example 20 includes the method of Example 15, wherein the first grant comprises a dynamic grant (DG) for an aperiodic (AP) CSI over the PUSCH and the second grant comprises a configured grant (CG) for the PUSCH, wherein the AP CSI over the PUSCH is associated with a first priority level and the CG for the PUSCH is associated with a second priority level, and wherein determining whether the second grant is to override the first grant comprises determining that the CG for the PUSCH overrides the AP CSI over the PUSCH.

Example 21 includes the method of Example 15, wherein the first grant comprises a configured grant (CG) for the PUSCH and the second grant comprises a dynamic grant (DG) for an aperiodic (AP) CSI over the PUSCH, wherein the CG for the PUSCH is associated with a first priority level and the AP CSI over the PUSCH is associated with a second priority level, and wherein determining whether the second grant is to override the first grant comprises determining that the AP CSI over the PUSCH overrides the CG for the PUSCH.

Example 22 includes the method of Example 15, wherein the first grant comprises a dynamic grant (DG) for the PUSCH with an uplink shared channel (UL-SCH) and the second grant comprises a configured grant for a semi-persistent (SP) CSI over the PUSCH, wherein the DG for the PUSCH with the UL-SCH is associated with a first priority level and the SP CSI over the PUSCH is associated with a second priority level, and wherein determining whether the second grant is to override the first grant comprises determining that the SP CSI over the PUSCH overrides the DG for the PUSCH with the UL-SCH.

Example 23 includes the method of Example 15, wherein the first grant comprises a first configured grant (CG) for the PUSCH and the second grant comprises a second CG for a semi-persistent (SP) CSI over the PUSCH, wherein the first CG for the PUSCH is associated with a first priority level and the SP CSI over the PUSCH is associated with a second priority level, and wherein determining whether the second grant is to override the first grant comprises determining that the SP CSI over the PUSCH overrides the first CG for the PUSCH.

Example 24 includes the method of Example 15, wherein the first grant comprises a dynamic grant (DG) for an aperiodic (AP) CSI over the PUSCH and the second grant comprises a configured grant (CG) for a semi-persistent (SP) CSI over the PUSCH, wherein the AP CSI over the PUSCH is associated with a first priority level and the SP CSI over the PUSCH is associated with a second priority level, and wherein determining whether the second grant is to override the first grant comprises determining that the SP CSI over the PUSCH overrides the AP CSI over the PUSCH.

Example 25 includes the method of any one of Example 16 to Example 24, wherein determining whether the second grant is to override the first grant is performed without any reference to a hybrid automatic repeat request (HARD) process identifier (ID).

Example 26 may include an apparatus comprising means to perform one or more elements of a method described in or related to any of the above Examples, or any other method or process described herein.

Example 27 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 28 may include an apparatus comprising logic, modules, or circuitry to perform one or more elements of a method described in or related to any of the above Examples, or any other method or process described herein.

Example 29 may include a method, technique, or process as described in or related to any of the above Examples, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 31 may include a signal as described in or related to any of the above Examples, or portions or parts thereof.

Example 32 may include a datagram, packet, frame, segment, protocol data unit (PDU), or message as described in or related to any of the above Examples, or portions or parts thereof, or otherwise described in the present disclosure.

Example 33 may include a signal encoded with data as described in or related to any of the above Examples, or portions or parts thereof, or otherwise described in the present disclosure.

Example 34 may include a signal encoded with a datagram, packet, frame, segment, PDU, or message as described in or related to any of the above Examples, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 36 may include a computer program comprising instructions, wherein execution of the program by a processing element is to cause the processing element to carry out the method, techniques, or process as described in or related to any of the above Examples, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to control override of a first grant of a first radio resource by a second grant of a second radio resource, the method comprising:
   determining that the second radio resource at least partially overlaps with the first radio resource;
   determining a physical layer priority of the first grant of the first radio resource and the second grant of the second radio resource, the physical layer priority based on at least one of the first grant of the first radio resource and the second grant of the second radio resource being configured for transmitting channel state information (CSI) feedback over a physical uplink shared channel (PUSCH) to a base station, wherein the CSI feedback comprises a semi-persistent (SP) CSI over the PUSCH, and wherein determining the physical layer priority comprises treating a first transmission of the SP CSI over the PUSCH as a dynamic grant (DG) PUSCH transmission and treating one or more second transmissions of the SP CSI over the PUSCH as a configured grant (CG) PUSCH transmission, wherein the one or more second transmissions are subsequent to the first transmission; and
   generating a transmission according to the physical layer priority.

2. The method of claim 1, wherein the first grant comprises a configured grant (CG) for a semi-persistent (SP) CSI over the PUSCH and the second grant comprises a dynamic grant (DG) for the PUSCH with an uplink shared channel (UL-SCH), wherein the SP CSI over the PUSCH is associated with a first priority level and the DG for the PUSCH with the UL-SCH is associated with a second priority level, and
   wherein determining the physical layer priority comprises, in response to determining that the second priority level is higher than the first priority level, determining that the DG for the PUSCH with the UL-SCH overrides the SP CSI over the PUSCH.

3. The method of claim 1, wherein the first grant comprises a first configured grant (CG) for a semi-persistent (SP) CSI over the PUSCH and the second grant comprises a second CG for the PUSCH, wherein the SP CSI over the PUSCH is associated with a first priority level and the second CG for the PUSCH is associated with a second priority level, and
   wherein determining the physical layer priority comprises, in response to determining that the second priority level is higher than the first priority level, determining that the second CG for the PUSCH overrides the SP CSI over the PUSCH.

4. The method of claim 1, wherein the first grant comprises a configured grant (CG) for a semi-persistent (SP) CSI over the PUSCH and the second grant comprises a dynamic grant (DG) for an aperiodic (AP) CSI over the PUSCH, wherein the SP CSI over the PUSCH is associated with a first priority level and the AP CSI over the PUSCH is associated with a second priority level, and
   wherein determining the physical layer priority comprises, in response to determining that the second priority level is higher than the first priority level, determining that the AP CSI over the PUSCH overrides the SP CSI over the PUSCH.

5. The method of claim 1, wherein the first grant comprises a first configured grant (CG) for a first semi-persistent (SP) CSI over the PUSCH and the second grant comprises a second CG for a second SP CSI over the PUSCH, wherein the first SP CSI over the PUSCH is associated with a first priority level and the second SP CSI over the PUSCH is associated with a second priority level, and wherein determining the physical layer priority comprises, in response to determining that the second priority level is higher than the first priority level, determining that the second SP CSI over the PUSCH overrides the first SP CSI over the PUSCH.

6. The method of claim 1, wherein the first grant comprises a dynamic grant (DG) for an aperiodic (AP) CSI over the PUSCH and the second grant comprises a configured grant (CG) for the PUSCH, wherein the AP CSI over the PUSCH is associated with a first priority level and the CG for the PUSCH is associated with a second priority level, and wherein determining the physical layer priority comprises, in response to determining that the second priority level is higher than the first priority level, determining that the CG for the PUSCH overrides the AP CSI over the PUSCH.

7. The method of claim 1, wherein the first grant comprises a configured grant (CG) for the PUSCH and the second grant comprises a dynamic grant (DG) for an aperiodic (AP) CSI over the PUSCH, wherein the CG for the PUSCH is associated with a first priority level and the AP CSI over the PUSCH is associated with a second priority level, and wherein determining the physical layer priority comprises, in response to determining that the second priority level is higher than the first priority level, determining that the AP CSI over the PUSCH overrides the CG for the PUSCH.

8. The method of claim 1, wherein the first grant comprises a dynamic grant (DG) for the PUSCH with an uplink shared channel (UL-SCH) and the second grant comprises a configured grant for a semi-persistent (SP) CSI over the PUSCH, wherein the DG for the PUSCH with the UL-SCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the DG for the PUSCH with the UL-SCH.

9. The method of claim 1, wherein the first grant comprises a first configured grant (CG) for the PUSCH and the second grant comprises a second CG for a semi-persistent (SP) CSI over the PUSCH, wherein the first CG for the PUSCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the first CG for the PUSCH.

10. The method of claim 1, wherein the first grant comprises a dynamic grant (DG) for an aperiodic (AP) CSI over the PUSCH and the second grant comprises a configured grant (CG) for a semi-persistent (SP) CSI over the PUSCH, wherein the AP CSI over the PUSCH is associated with a first priority level and the SP CSI over the PUSCH is associated with a second priority level, and wherein determining the physical layer priority comprises, in response to determining that the second priority level is higher than the first priority level, determining that the SP CSI over the PUSCH overrides the AP CSI over the PUSCH.

11. The method of claim 1, wherein the CSI feedback comprises an aperiodic (AP) CSI over the PUSCH, and wherein determining the physical layer priority comprises treating the AP CSI over the PUSCH as a PUSCH with uplink shared channel (UL-SCH) for dynamic grant (DG) and configured grant (CG) prioritization processing.

12. A method in base station for controlling override of a first grant of a first radio resource, the method comprising:

transmitting, to a user equipment (UE), a second grant of a second radio resource, the second radio resource at least partially overlapping with the first radio resource, wherein the first grant comprises a configured grant (CG) for a semi-persistent (SP) channel state information (CSI) over a physical uplink shared channel (PUSCH) and the second grant comprises a dynamic grant (DG) for an aperiodic (AP) CSI over the PUSCH, wherein the SP CSI over the PUSCH is associated with a first priority level and the AP CSI over the PUSCH is associated with a second priority level; and determining whether the second grant is to override the first grant based on at least one of the first grant of the first radio resource and the second grant of the second radio resource being configured for transmitting CSI feedback over the PUSCH from the UE to the base station, wherein determining whether the second grant is to override the first grant comprises determining that the AP CSI over the PUSCH overrides the SP CSI over the PUSCH.

13. The method of claim 12, wherein the first grant comprises a configured grant (CG) for a semi-persistent (SP) CSI over the PUSCH and the second grant comprises a dynamic grant (DG) for the PUSCH with an uplink shared channel (UL-SCH), wherein the SP CSI over the PUSCH is associated with the first priority level and the DG for the PUSCH with the UL-SCH is associated with the second priority level, and wherein determining whether the second grant is to override the first grant comprises determining that the DG for the PUSCH with the UL-SCH overrides the SP CSI over the PUSCH.

14. The method of claim 12, wherein the first grant comprises a first configured grant (CG) for a semi-persistent (SP) CSI over the PUSCH and the second grant comprises a second CG for the PUSCH, wherein the SP CSI over the PUSCH is associated with the first priority level and the second CG for the PUSCH is associated with the second priority level, and wherein determining whether the second grant is to override the first grant comprises determining that the second CG for the PUSCH overrides the SP CSI over the PUSCH.

15. The method of claim 12, wherein the first grant comprises a first configured grant (CG) for a first semi-persistent (SP) CSI over the PUSCH and the second grant comprises a second CG for a second SP CSI over the PUSCH, wherein the first SP CSI over the PUSCH is associated with the first priority level and the second SP CSI over the PUSCH is associated with the second priority level, and wherein determining whether the second grant is to override the first grant comprises determining that the second SP CSI over the PUSCH overrides the first SP CSI over the PUSCH.

16. The method of claim 12, wherein the first grant comprises a dynamic grant (DG) for an aperiodic (AP) CSI over the PUSCH and the second grant comprises a configured grant (CG) for the PUSCH, wherein the AP CSI over the PUSCH is associated with the first priority level and the CG for the PUSCH is associated with the second priority level, and wherein determining whether the second grant is to override the first grant comprises determining that the CG for the PUSCH overrides the AP CSI over the PUSCH.

17. The method of claim 12, wherein the first grant comprises a configured grant (CG) for the PUSCH and the second grant comprises a dynamic grant (DG) for an aperiodic (AP) CSI over the PUSCH, wherein the CG for the PUSCH is associated with the first priority level and the AP CSI over the PUSCH is associated with the second priority level, and wherein determining whether the second grant is to override the first grant comprises determining that the AP CSI over the PUSCH overrides the CG for the PUSCH.

18. The method of claim 12, wherein the first grant comprises a dynamic grant (DG) for the PUSCH with an uplink shared channel (UL-SCH) and the second grant comprises a configured grant for a semi-persistent (SP) CSI over the PUSCH, wherein the DG for the PUSCH with the UL-SCH is associated with the first priority level and the SP CSI over the PUSCH is associated with the second priority level, and wherein determining whether the second grant is to override the first grant comprises determining that the SP CSI over the PUSCH overrides the DG for the PUSCH with the UL-SCH.

* * * * *